(12) United States Patent
Wilson et al.

(10) Patent No.: US 7,237,434 B2
(45) Date of Patent: Jul. 3, 2007

(54) SLOTTED DAMPING SECTION FOR AERODYNAMIC WIND TUNNEL

(75) Inventors: Geoffrey C Wilson, Lake Orion, MI (US); Mark E Gleason, Farmington Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 144 days.

(21) Appl. No.: 10/836,435

(22) Filed: Apr. 30, 2004

(65) Prior Publication Data

US 2005/0241385 A1 Nov. 3, 2005

(51) Int. Cl.
*G01M 9/00* (2006.01)

(52) U.S. Cl. .................. 73/147; 73/865.6

(58) Field of Classification Search .......... 73/147, 73/117.1, 117.4, 865.6; 404/1, 74; 434/34, 434/252, 258; 472/49, 50, 136
See application file for complete search history.

(56) References Cited

U.S. PATENT DOCUMENTS

| | | | | |
|---|---|---|---|---|
| 3,552,202 | A | * | 1/1971 | Kroeger et al. ............ 73/147 |
| 3,628,380 | A | * | 12/1971 | Feldman .................... 73/147 |
| 5,025,659 | A | | 6/1991 | Starr, Jr. et al. |
| 5,366,094 | A | * | 11/1994 | Stein ....................... 209/138 |
| 6,083,110 | A | * | 7/2000 | Kitchen et al. ............ 472/49 |
| 6,644,355 | B1 | * | 11/2003 | Gleason ..................... 138/37 |
| 6,694,808 | B2 | * | 2/2004 | Sawada et al. ............. 73/147 |
| 6,725,912 | B1 | * | 4/2004 | Moll et al. ................ 165/144 |
| 6,748,800 | B2 | * | 6/2004 | Lacey, Jr. .................. 73/147 |
| 6,752,563 | B2 | * | 6/2004 | Ide ............................ 404/1 |
| 6,820,477 | B2 | * | 11/2004 | Markstaller et al. ........ 73/147 |
| 6,997,049 | B2 | * | 2/2006 | Lacey, Jr. .................. 73/147 |
| 2003/0070479 | A1 | | 4/2003 | Lacey, Jr. |
| 2003/0089167 | A1 | * | 5/2003 | Markstaller et al. ........ 73/147 |
| 2004/0089065 | A1 | * | 5/2004 | Lacey, Jr. .................. 73/147 |
| 2005/0120788 | A1 | * | 6/2005 | Markstaller et al. ........ 73/147 |

OTHER PUBLICATIONS

SAE Technical Paper Series, 1999-01-0813, "On Low-Frequency Pressure Pulsations and Static Pressure Distribution in Open Jet Automotive Wind Tunnels," Stephen A. Arnette, Tony D. Buchanan and Michael Zabat; Mar. 1-4, 1999, pp. 1-15.

SAE Technical Paper Series, 2000-01-0869, "Wind Tunnel Pulsations and Their Active Suppression," Gerhard Wickern, Wilhelm von Heesen and Steffen Wallmann, Mar. 6-9, 2000, pp. 1-14.

SAE Technical Paper Series, 2003-01-0426, The DaimlerChrysler Full-Scale Aeroacoustic Wind Tunnel, Joel Walter, Edward Duell, Bill Martindale, Stephen Arnette, Robert Gierman and Mark Gleason and Gary Romberg, Mar. 3-6, 2003.

(Continued)

*Primary Examiner*—Eric S. McCall
(74) *Attorney, Agent, or Firm*—Ralph E. Smith

(57) ABSTRACT

A damping section, for an aerodynamic wind tunnel having a test section defined by a nozzle mouth at an upstream end and a collector mouth at a downstream end, is adapted to conform to a perimeter of the collector mouth and extend in the downstream end of the test section, and includes a slotted section adapted to dissipate irregularities in the flow of air at the perimeter of the collector mouth.

13 Claims, 4 Drawing Sheets

OTHER PUBLICATIONS

SAE Technical Paper Series, 2003-01-0426, The DaimlerChrysler Full-Scale Aeroacoustic Wind Tunnel, Joel Walter, Edward Duell, Bill Martindale, Stephen Arnette, Robert Gierman and Mark Gleason and Gary Romberg, Mar. 3-6, 2003.

SAE, 2002-01-0251, "A Study of the Pulsations in a ¾ Open Jet Wind Tunnel," John Lacey, pp. 1-10, Copyright © 2002 Society of Automotive Engineers, Inc.

SAE Technical Paper Series, 2003-01-0451, "Mechanical Properties of High Temperature Sintered P/M 409LE and 409LNi Stainless Steels Utilized in the Manufacturing of Exhaust Flangers and Oxygen Sensor Bosses, " Suresh O. Shah, James R. McMillen, Prasan K. Samal, Leander F. Pease III, Mar. 3-6, 2003.

SAE, "Surface Vehicle Information Report, " Issued Mar. 1990, Revised Jun. 1994, Rev. Jun. '94, pp. 53-118.

SAE Technical Paper Series, "On the Correction of Interference Effects in Open Jet Wind Tunnels, " Edzard Mercker and Jochen Wiedemann, Feb. 26-29, 1996, pp. 1-15.

SAE Technical Paper Series, "Contemplation of Nozzle Blockage in Open Jet Wind-Tunnels in View of Different 'Q' Determination Techniques," Edzard Mercker, Gerhard Wickern and Jochen Weidemann, Feb. 24-27, 1997, pp. 41-50.

SAE Technical Paper Series, "Effect of Test Section Configuration on Aerodynamic Drag Measurements," Jeffrey Hoffman, Bill Martindale, Stephen Arnette, Jack Williams and Stan Wallis, Mar. 5-8, 2001.

SAE Technical Paper Series, "The Chrysler ⅜-Scale Pilot Wind Tunnel," Gary F. Romberg, James A. Gunn and Ronald G. Lutz, Feb. 28-Mar. 3, 1994, pp. 63-86.

"Influence of Test-Section Length and Collector Area on Measurements in ¾-Open-Jet Automotive Wind Tunnels," Friedrich K. von Schulz-Hausmann and Jorg-Dieter Vagt, pp. 100-107.

SAE Techincal Paper Series, "Influence of Plenum Dimensions on Drag Measurements in ¾-Open-Jet Automotive Wind Tunnels," K. Rainer Duetenbach, Feb. 27-Mar. 2, 1995, pp. 189-198.

SAE Technical Paper Series, "Reference Static and Dynamic Pressures in Automotive Wind Tunnels," Bart C. Nijhof and Gerhard Wickern, Mar. 3-6, 2003.

Agard Conference Proceedings 565, "Aerodynamics of Wind Tunnel Circuits and their Components," Sep. 30-Oct. 3, 1996, Published in Jun. 1997 (400+ pages).

* cited by examiner

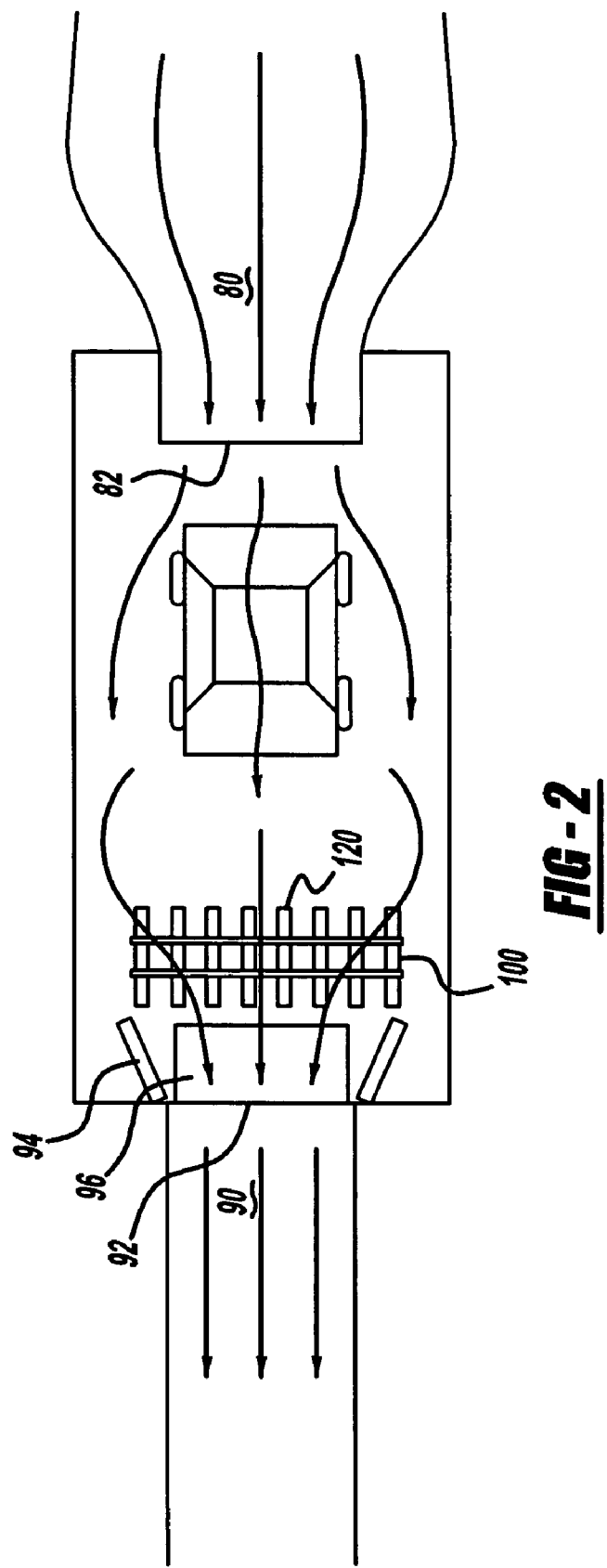

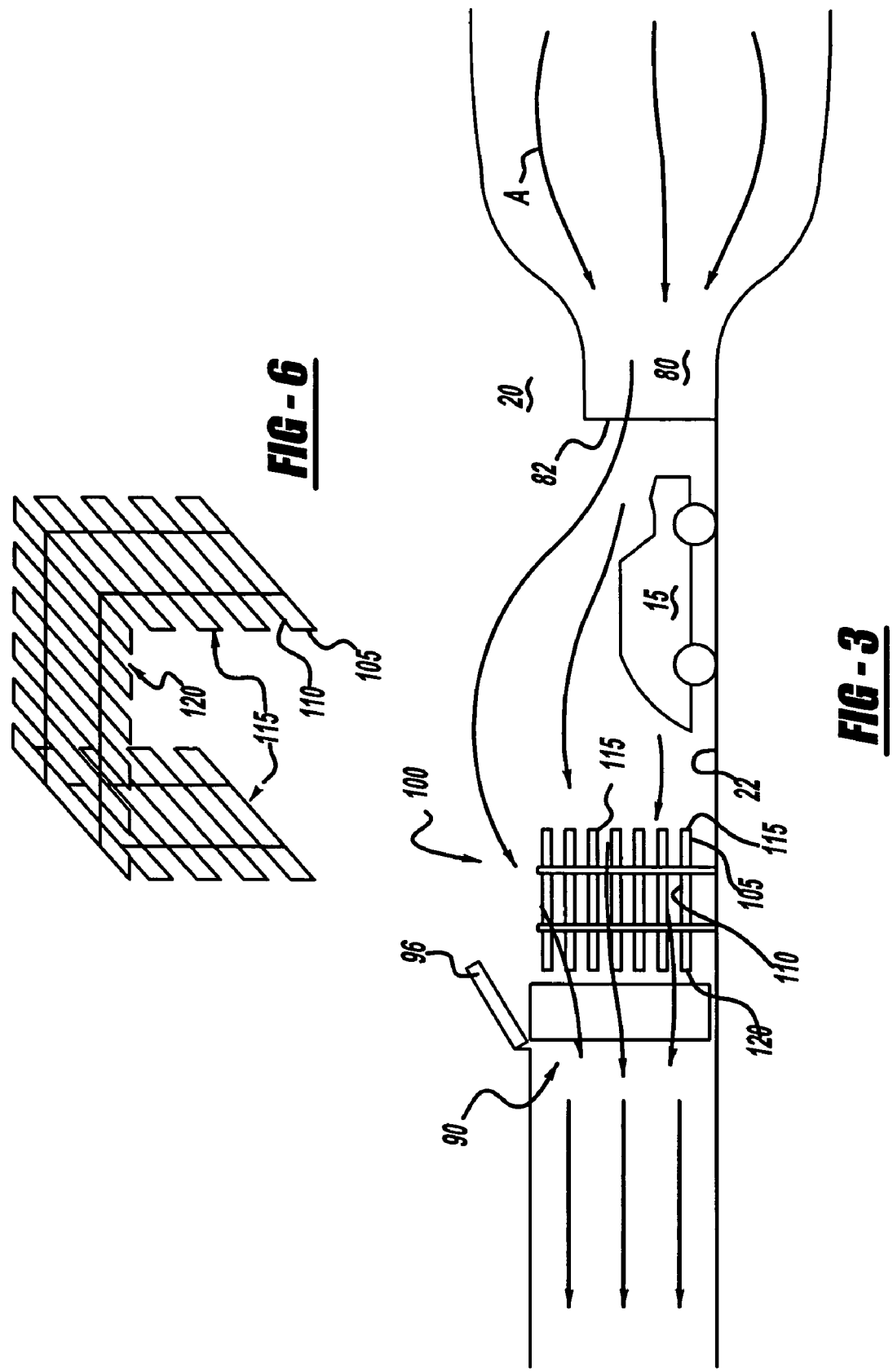

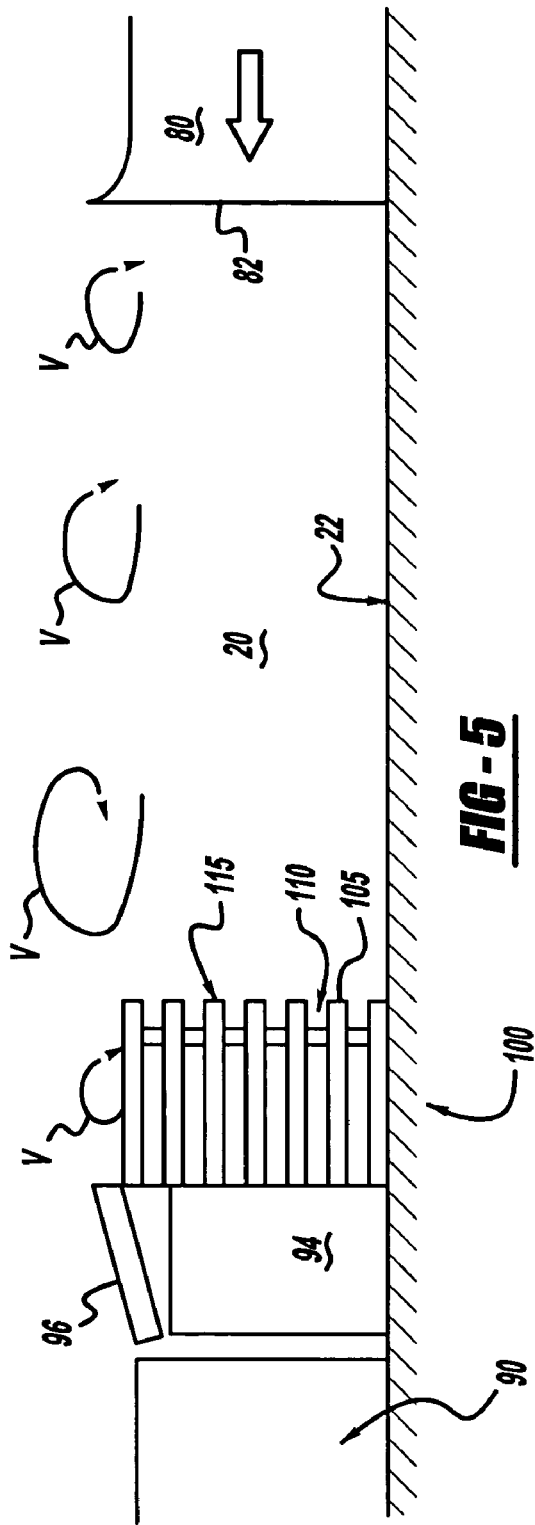

SLOTTED DAMPING SECTION FOR AERODYNAMIC WIND TUNNEL

CROSS-REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

The present invention relates generally to fluid flow systems. In one of its aspects, the invention relates to the control of fluid flow in a wind tunnel system, and the elimination of extraneous noise and pressure fluctuation within a test section of the wind tunnel system.

2. Description of Related Art

Generally, the purpose of a wind tunnel is to measure the effect of the passage of a high velocity fluid, in this case air, over a body under controlled conditions. Such body may be an airplane, a building structure or an automobile.

In a wind tunnel, the prime consideration is to be able to control the velocity and the uniformity of the air flow. One very impractical method of doing this is to have a very long straight wind tunnel with the right combination of cross-sectional area and input wind generation power. This is impractical because each end of such a wind tunnel must be open to the atmosphere. Therefore, the common practice is to make the wind tunnel a loop so that no make up air is needed, debris can be prevented from entering the tunnel, energy is conserved, and other factors, such as air temperature, can be controlled.

Additionally the wind tunnel must simulate as closely as possible the wind environment that is present around the vehicle when it is moving in its natural environment. To accomplish this, wind tunnels with straight solid walls are made with very large test sections so that the vehicle under test blocks only about 5% of the cross section of the wind tunnel throat. In an open jet wind tunnel (or semi-open jet wind tunnels which have a floor surface) the tunnel can be built much smaller due to the fact that the test vehicle can block as much as 15% of the throat area without significant distortion to the air flow field around the vehicle. However, the open jet tunnel design introduces the distinct possibility that a hydro-acoustic resonance will be set up within the tunnel circuit that causes fluctuations of the velocity of the air in the test section. These fluctuations occur as various acoustic feedback paths excite the fluid field inside of the wind tunnel. The resulting unsteady flow field will no longer support appropriate aerodynamic or aero/acoustic wind tunnel testing. This is due to the fact that the aerodynamic forces vary in proportion to the velocity squared in the testing, and the noise amplitudes rise with the fifth sixth order of wind velocity. So the fluctuations must be reduced or eliminated to achieve satisfactory test conditions.

The solution of this resonance has been approached from a variety of different directions. Different dimensions of the open jet wind tunnel test section and various designs of collector "flaps" have been utilized with varying degrees of success. Some of these solutions resulted in test sections that were too short for the vehicles being examined causing distortions in aerodynamic data. Other solutions isolated the resonance phenomenon to specific speed ranges, but did not eliminate it.

For the purposes of aerodynamic evaluation of solid bodies, it would be advantageous to provide a wind tunnel assembly that minimizes unsteady pressure fluctuations, speed variations with time, pressure field distortions and the noise generated and attributable to the wind tunnel itself, under the entire range of operating speeds.

BRIEF SUMMARY OF THE INVENTION

An aerodynamic wind tunnel comprises a test section having an upstream end and a downstream end, a nozzle positioned near the upstream end of the test section, a collector positioned near the downstream end of the test section, and a damping section positioned in the downstream end of the test section, upstream of the collector.

A damping section, for an aerodynamic wind tunnel having a test section defined by a nozzle mouth at an upstream end and a collector mouth at a downstream end, is adapted to conform to a perimeter of the collector mouth and extend into the downstream end of the test section, and comprises a slotted section adapted to dissipate irregularities in the flow of air at the perimeter of the collector mouth.

In a further embodiment, the damping section comprises a top panel and a pair of depending side panels formed of a plurality of parallel slats defining the slotted section.

BRIEF DESCRIPTION OF THE SEVERAL VIEWS OF THE DRAWINGS

The present invention will become more fully understood from the detailed description and the accompanying drawings, wherein:

FIG. 2 is an enlarged plan view of the wind tunnel with slotted damping section Of FIG. 1.

FIG. 3 is a side view of the wind tunnel with slotted damping section of FIGS. 1–2.

FIG. 4 is a side view of the formation of wind vortices and reflected pressure waves in a prior art wind tunnel.

FIG. 5 is a side view of the formation of wind vortices and the damping of pressure waves in a wind tunnel with slotted damping section of FIGS. –-3.

FIG. 6 is a perspective view of the slotted damping section of FIGS. 1–3 and 5.

DETAILED DESCRIPTION OF THE INVENTION

Figure 1:
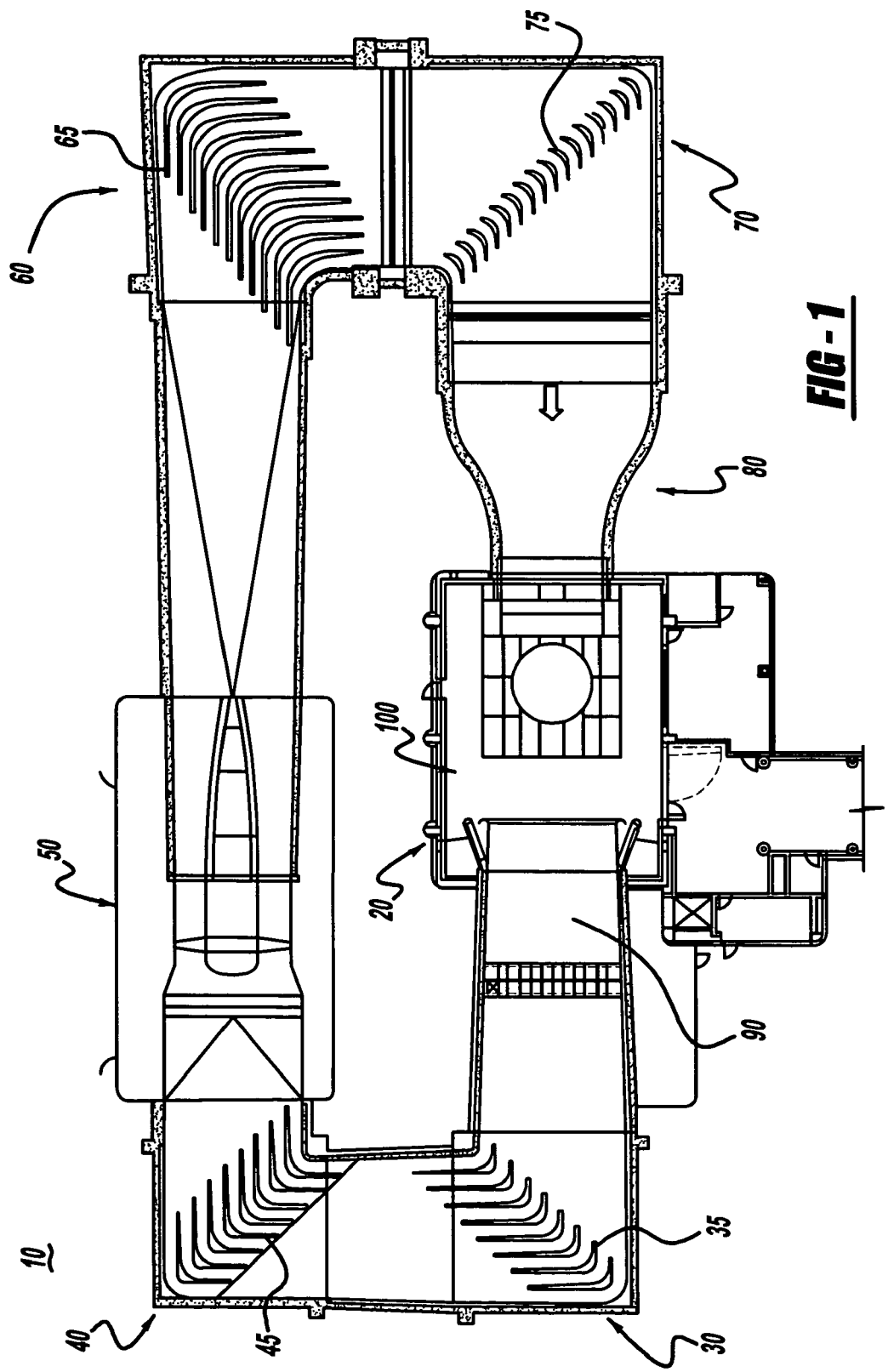
FIG. 1 is a plan view of a wind tunnel with a slotted damping section according to the invention.

An aerodynamic wind tunnel 10 having a slotted damping section 100 according to the invention is shown in FIGS. 1–3 and 5. Referring with particularity to FIG. 1, the aerodynamic wind tunnel 10 is formed in a closed loop for environmental control of the air flow. Air flows in the illustrated aerodynamic wind tunnel 10 in a clockwise direction.

Beginning with the test section 20, the air flows into the collector 90, then to the first corner 30 and second corner 40, which contain turning vanes 35, 45, for redirecting the air flow around each corner. From the second corner 40, the flow of air then passes through the flow generator 50. Flow generator 50 can comprise a fan blade/stator arrangement of conventional design.

After the flow generator 50, the flow of air then enters the third and fourth corners 60, 70, with turning vanes 65, 75 respectively. After passing through fourth corner 70, the air flow passes through nozzle section 80 to increase its speed to the desired test speed, at which speed it re-enters the test section 20.

Referring now to FIGS. 2–3, the test section 20 is defined between the nozzle 80 and the collector 90. A test vehicle 15 is placed within the test section 20 on test section floor 22, which can incorporate a balance or other load measuring device (not shown). Air flows in currents A from nozzle 80 through nozzle opening 82 into test section 20. The air flows through test section 20, around test vehicle 15, and into collector 90.

The mouth 92 of collector 90 is conventionally surrounded with collector flaps 94, 96. Collector flaps 94, 96 serve to funnel the air flow A into the mouth 92 of collector 90. Referring briefly to FIG. 4, as the air flows out of nozzle 80 into the test section 20, vortices V are formed, particularly proximate the edges of nozzle mouth 82. These vortices V travel the length of the test section 20 until they impinge upon the collector flaps 94, 96 surrounding collector mouth 92, or other wind tunnel structure. The collector flaps 94, 96 are angled outwardly to direct more air flow into the collector mouth 92. As a result, when the vortices impinge upon the collector flaps 94, 96, or other wind tunnel structure, some portion of the air flow is deflected back into the test section 20. This reflected air sets up a harmonic, resulting in a reflected wave front P detectable as pulsations in the test section 20.

Referring again to FIGS. 2–3, and now to FIG. 5–6, a slotted damping section 100 according to the invention is positioned in the test section 20, proximate to the collector 90. The slotted damping section 100, as illustrated, is formed of a plurality of slats 105. The slats 105 are rigidly held separated from one another, in a parallel orientation, forming a gap or slot 110 therebetween. The slats 105 are banded together to form a partial box for placement in front of collector 90. Slotted damping section 100 is formed with a top panel 120 and depending side panels 115. The generally straight top and side panels 115, 120 are formed to conform to the perimeter of collector mouth 92, although it is anticipated that the profile of the damping section 100 can be arcuate. It is also anticipated that the slotted damping section 100 can be formed of a solid panel or panels, with slots 110 cut or formed therein.

Referring to FIG. 5, the vortices V traverse the test section 20 and encounter the slotted damping section 100 before they impinge upon the collector flaps 94, 96, or other wind tunnel structure. When the vortices V encounter the slotted damping section 100, the vortices V are dissipated. The vortices V are thereby weakened before impinging upon the collector flaps 94, 96, or other wind tunnel structure. As a result, the weakened vortices V do not strike the collector flaps or other wind tunnel structure with sufficient magnitude to form a wave front P that is reflected back into the test section 20. The pulsations associated with the reflected wave front P are thereby eliminated, aiding in the development of more accurate aerodynamic and acoustic data in the evaluation of test vehicle 15.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the scope of the appended claims.

What is claimed is:

1. An aerodynamic wind tunnel comprising:
   a test section having an upstream end and a downstream end;
   a nozzle positioned near the upstream end of the test section;
   a collector defining an opening positioned near the downstream end of the test section; and
   a damping section including a plurality of slats defining a plurality of slots positioned in the downstream end of the test section, upstream of the collector, the plurality of slats defining a top panel and a pair of depending side panels that substantially conform to a perimeter of the collector opening;
   wherein each slat is substantially perpendicular to a cross-sectional area of the collector opening.

2. The wind tunnel of claim 1, further comprising at least one collector flap disposed between the collector opening and the damping section to direct air flow from the damping section into the collector opening.

3. The wind tunnel of claim 1, wherein at least one of the top panel and depending side panels are formed of a solid panel having the slots formed therein.

4. The wind tunnel of claim 1, wherein the damping section is spaced apart from the collector opening.

5. The wind tunnel of claim 1, wherein the plurality of slats are rigidly held separated from one another.

6. The wind tunnel of claim 1, wherein the plurality of slats are rigidly held separated from one another by the slots.

7. The wind tunnel of claim 6, wherein the plurality of slots traverse a length of the damping section.

8. A damping section for an aerodynamic wind tunnel having a test section defined by a nozzle mouth at an upstream end and a collector mouth at a downstream end, the damping section including a plurality of slats defining a plurality of slots and extending in the downstream end of the test section, the plurality of slats defining a top panel and a pair of depending side panels that substantially conform to a perimeter of the collector mouth to dissipate irregularities in the flow of air at the perimeter of the collector mouth, the fixed stats being substantially perpendicular to a cross-sectional area of the collector mouth.

9. The aerodynamic wind tunnel of claim 8, wherein the plurality of slats of the top panel are formed substantially perpendicular to the plurality of slots of the depending side panels.

10. The wind tunnel of claim 8, further comprising at least one collector flap disposed between the collector mouth and the damping section to direct air flow from the damping section into the collector mouth.

11. The wind tunnel of claim 8, wherein at least one of the top panel and depending side panels are formed of a solid panel having the slots formed therein.

12. The wind tunnel of claim 8, wherein the damping section is spaced apart from the collector mouth.

13. The wind tunnel of claim 8, wherein the plurality of slats are rigidly held separated from one another.

* * * * *